United States Patent
Ikeda et al.

(10) Patent No.: US 7,071,280 B2
(45) Date of Patent: Jul. 4, 2006

(54) ADHESIVE AND PACKAGING LAMINATE USING THE SAME

(75) Inventors: Akira Ikeda, Tokyo (JP); Ryohei Ikeda, Tokyo (JP); Keishi Fukuda, Tokyo (JP); Yasuki Nakajima, Tokyo (JP)

(73) Assignees: Toyo Ink Mfg. Co., Ltd., Tokyo (JP); Toyo-Morton, Ltd., Tokyo (JP)

( * ) Notice: Subject to any disclaimer, the term of this patent is extended or adjusted under 35 U.S.C. 154(b) by 64 days.

(21) Appl. No.: 10/973,404

(22) Filed: Oct. 27, 2004

(65) Prior Publication Data

US 2005/0143552 A1 Jun. 30, 2005

(30) Foreign Application Priority Data

Oct. 29, 2003 (JP) ............................. 2003-368566

(51) Int. Cl.
*C08G 18/42* (2006.01)

(52) U.S. Cl. ............................. 528/73; 528/28; 528/80; 528/905; 428/425.8

(58) Field of Classification Search ................. 528/28, 528/73, 80, 905; 428/425.8
See application file for complete search history.

(56) References Cited

FOREIGN PATENT DOCUMENTS

JP 60-243182 12/1985

*Primary Examiner*—Rachel Gorr
(74) *Attorney, Agent, or Firm*—Oblon, Spivak, McClelland, Maier & Neustadt, P.C.

(57) ABSTRACT

Disclosed is an adhesive and a packaging laminate produced by using the same. The adhesive contains a polyisocyanate and a partially acid-modified polyol which is a product of reacting a polyol with anhydrotrimellitic acid and an anhydrotrimellitate ester at a ratio such that the anhydrotrimellitic acid is 10 to 70% by mass and the anhydrotrimellitate ester is 90 to 30% by mass, as the sum of the anhydrotrimellitic acid and the anhydrotrimellitate ester is 100% by mass. The packaging laminate has a first and second sheet-shaped substrates and the above adhesive through which the first and second sheet-shaped substrates are laminated.

10 Claims, No Drawings

ADHESIVE AND PACKAGING LAMINATE USING THE SAME

BACKGROUND OF THE INVENTION

The present invention relates to an adhesive having excellent adhesion performance suitably used in producing a laminate for packaging food, medical supplies, cosmetics, and the like by laminating a plurality of films such as various plastic films, metallized films, metal foils and the like. Also, the invention relates to a laminate used in packaging for food, medical supplies, cosmetics and the like.

RELATED ART

Recently, conjugated articles that are produced by multi-layer laminating a metal foil such as an aluminum foil or a metallized film and a plastic film such as polyethylene, polypropylene, vinyl chloride, polyesters and nylon have been used as packaging materials for food, medical supplies, cosmetics, and the like (for example, see Japanese Patent Application Laid-Open No. 60-243182). As an adhesive that binds the plastic film like the above plastic films and the metal foil or metallized film together known is a combination of an isocyanate compound and a polyester which is made to have a carboxyl group at least at one terminal thereof by allowing a polyester polyol to react with an aromatic multivalent carboxylic anhydride.

However, if high-temperature sterilization treatment by boiling or retorting is required, such adhesive poses the problem of partial adhesion failure resulting in appearance defect due to careless bending or of the deterioration of performance with time depending on the contents or the substrate, in operation such as piling up after retorting. For instance, if a bag prepared using a general composite film comprising a polyester or a nylon/aluminum foil/unstretched polypropylene film is filled with, as contents, a high acidity food such as vinegar, soy sauce or sauce, oily food or a mixture thereof and then retort treated, the disadvantage of lowering the adhesion strength or generating pin holes in the aluminum foil over the lapse of time immediately after retorting.

The present invention is directed to the provision of an adhesive that can provide high adhesion strength among laminate substrates and is capable of holding high adhesion strength over a long period of time.

Also, the present invention is directed to the provision of a laminate for packaging with no appearance deterioration caused by careless bending in piling up after retorting when the laminate is used as a food packaging material, and further, with no lowering of adhesion strength among laminate substrates with the lapse of time or no generation of pin holes, when high acidity food or oily food is filled therewith.

BRIEF SUMMARY OF THE INVENTION

According to one aspect of the present invention, the adhesive comprises: a polyisocyanate; and a partially acid-modified polyol which comprises a product of reacting a polyol with anhydrotrimellitic acid and an anhydrotrimellitate ester at a ratio such that the anhydrotrimellitic acid is 10 to 70% by mass and the anhydrotrimellitate ester is 90 to 30% by mass, as the sum of the anhydrotrimellitic acid and the anhydrotrimellitate ester is 100% by mass.

In addition, according to another aspect of the present invention, a laminate for packaging laminate comprises a first sheet-shaped substrate and a second sheet-shaped substrate which are laminated through an adhesive layer formed of the above-described adhesive.

An adhesive of the present invention is excellent in adhesion performance as compared with conventional urethane-based adhesives since a partially acid-modified polyol that a portion of the hydroxyl groups of a polyol is modified by esterification with an anhydrotrimellitic acid and an anhydrotrimellitate ester is used, and in particular has the advantages of exhibiting particularly excellent adhesion strength to plastic films such as a polyester, a polyamide or polypropylene, a vapor deposited films with a metal such as aluminum, silicon oxide or aluminum oxide, and metals such as stainless steel, iron, copper and lead, exhibiting also hot water resistance, acid resistance, and oil resistance, and maintaining high adhesion strength over a long period of time.

Furthermore, a laminate for packaging, using an adhesive according to the present invention, has the advantages of rarely offering appearance deterioration attributable to careless bending on piling up after retorting on account of high adhesion strength between laminated substrates and further of not generating a decrease in adhesion strength with the lapse of time even when high acidity food or oily food is packed as the contents.

DETAILED DESCRIPTION OF THE INVENTION

First, an adhesive of the present invention will be described. A partially acid-modified polyol contained in the adhesive of the present invention comprises a product by reacting a polyol with anhydrotrimellitic acid and an anhydrotrimellitate ester, while adjusting the ratio of anhydrotrimellitic acid to the anhydrotrimellitate ester to from 10 to 70% by mass to from 90 to 30% by mass, and allowing to react a portion of the hydroxyl groups in the polyol with the anhydrotrimellitic acid and the anhydrotrimellitate ester.

As the polyol described above, a polyol compound in which the number of the functional groups thereof is 2 to 6, preferably 2 to 4 can be suitably used. Examples of the polyol that may be used include polyester polyols, polyether polyols, polyether polyester polyols, polyurethane polyols, polyester amide polyols, acrylic polyols, polycarbonate polyols, polyhydroxy alkanes, ricinus oil, and mixtures thereof. Of these polyols, a polyurethane polyol is preferred because it renders the cohesive force of the adhesive large due to the introduction of urethane bonding, thereby appropriately improving a variety of resistance properties such as adhesive force, heat resistance and the like.

For the polyols, the number average molecular weight thereof is preferably from 500 to 100,000, more preferably from 1,000 to 30,000. The use of a polyol having a number average molecular weight of less than 500 makes small the cohesive force of a resulting adhesive and low the adhesion strength. The use of a polyol having a number average molecular weight exceeding 100,000, in terms of synthesis, makes it difficult to react anhydrotrimellitic acid and an anhydrtrimellitate ester with hydroxyl groups in the polyol, possibly causing an extreme viscosity increase or gelation. Also, because the viscosity of the adhesive in the production of a laminate is large, the adhesive loses flowability, readily leading to a poor appearance of the laminate.

The polyester polyols include, for example, polyester polyol compounds prepared by reacting a dibasic acid such as terephthalic acid, isophthalic acid, adipic acid, azelaic acid and sebaric acid or a dialkyl ester thereof or a mixture thereof, with a glycol such as ethylene glycol, propylene glycol, diethylene glycol, butylene glycol, neopentyl glycol, 1,6-hexanediol, 3-methyl-1,5-pentanediol, 3,3'-dimethylol-heptane, polyoxyethylene glycol, polyoxypropylene glycol and polytetramethylene ether glycol, or a mixture thereof; or polyester polyol products obtained by ring opening polymerizing a lactone such as polycaprolactone, polyvalerolactone, poly(β-methyl-γ-valerolactone) and the like.

The polyether polyols include, for example, polyether polyol products obtained by polymerizing an oxirane compound such as ethylene oxide, propylene oxide, butylene oxide, tetrahydrofuran and the like, using, as an initiator, water or a low molecular weight polyol such as ethylene glycol, propylene glycol, trimethylol propane, glycerin and the like.

The polyether polyester polyols include, for example, polyether polyester polyol compounds obtained by reacting the aforementioned polyether polyol with a dibasic acid such as terephthalic acid, isophthalic acid, adipic acid, azelaic acid, sebaric acid and the like or a dialkyl ester thereof or a mixture thereof.

The polyurethane polyols are polyol compounds having urethane bonding, and for example, are obtained by blending a polyether polyol, a polyester polyol, or a polyether polyester polyol, having a number average molecular weight of from 200 to 20,000, with a polyisocyanate in such a way that the molar ratio of NCO/OH is less than 1, preferably from 0.3 to 0.98, and reacting them. In particular, a polyester polyurethane polyol obtained by reacting a polyester polyol with a polyisocyanate in the molar ratio of NCO/OH being less than 1 is preferable because of exhibiting a large cohesion force and excellent adhesion to a metal.

The polyester amide polyols include species obtained by using together, as a starting material, an aliphatic diamine having amino groups such as, for example, ethylene diamine, propylene diamine and hexamethylene diamine in reacting a dibasic acid or a dialkyl ester thereof or a mixture thereof with a glycol or a mixture thereof.

The acrylic polyols include species obtained by copolymerizing an acrylate ester having a hydroxyl group such as hydroxyethyl acrylate, hydroxypropyl acrylate, hydroxybutyl acrylate and the like, or a corresponding methacrylate ester with, for example, acrylic acid, methacrylic acid or esters thereof.

The polycarbonate polyols include species obtained by reacting, for example, the glycol described above or a mixture thereof with dimethylcarbonate, diphenylcarbonate, ethylene carbonate, phosgene or the like.

The anhydrotrimellitate ester is an ester compound obtained by esterification reacting an alkylene glycol or alkane triol having 2 to 30 carbon atoms with anhydrotrimellitic acid. Of these compounds, an alkylene glycol chain of an excessive length lowers the densities of the polar groups of urethane bonding and ester bonding, being easily to decrease adhesion. On the other hand, use of an alkane triol suddenly raises the possibility of the viscosity increase and gelation during synthesis. Thus the preferred species include ethylene glycol bisanhydrotrimellitate represented by the formula (1) below.

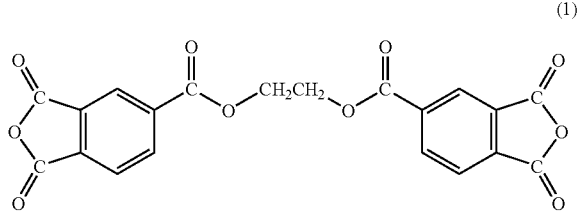

(1)

Importantly, the blending ratio of anhydrotrimellitic acid to the anhydrotrimellitate ester is from 10 to 70% by mass to from 90 to 30% by mass, as the sum of them both is 100%. If the amount of anhydrotrimellitic acid is less than 10% by mass (the amount of anhydrotrimellitate ester exceeds 90% by mass), the molecular weight of a resultant partially acid-modified polyol is increased, which takes places an increase in the viscosity of the adhesive resulting in a poor appearance of the laminate. If the amount of anhydrotrimellitic acid exceeds 70% by mass (the amount of anhydrotrimellitate ester is less than 30% by mass), the molecular weight of a resultant partially acid-modified polyol is decreased, which deteriorates the solution appearance with the lapse of time. Thus both cases cannot achieve the object of the present invention.

The reaction of the aforementioned polyol with both the anhydrotrimellitic acid and anhydrotrimellitate ester is carried out by controlling the reaction temperature to be 200° C. or less in order that the esterification reaction by ring opening of the anhydrotrimellitic acid and anhydrotrimellitate ester is the primary reaction. Also, anhydrotrimellitic acid and the anhydrotrimellitate ester are preferably allowed to react with a polyol so that 20 to 90% of the hydroxyl groups of the polyol are esterified with the anhydrotrimellitic acid and the anhydrotrimellitate ester. In this case, "%" is based on the number of hydroxyl groups. If the above numerical value of reacting hydroxyl ratio is less than 20%, it does not sufficiently improve the resistance properties of a resulting adhesive to the contents. Also, if the above numerical value exceeds 90%, unreacted portions of anhydrotrimellitic acid and anhydrotrimellitate ester are easily to be remained and these unreacted portions enter the partially acid-modified polyol in a suspension state, which is not preferable since the resulting material finally adversely affects the physical properties such as the strength of adhesion to a laminated substrate.

The examples of the polyisocyanate contained in additives of the present invention that may be used include: aliphatic diisocyanates, alicyclic diisocyanates, aromatic diisocyanate, aromatic aliphatic diisocyanates; polyisocyanate monomers having 3 functional groups or more, and dimmers, trimers, biuret and allophanates derived from the polyisocyanate monomer; polyisocyanates having a 2,4,6-oxadiazintrion ring obtained from carbon dioxide and the above polyisocyanate monomer, and the like.

The aliphatic diisocyanates include, for example, trimethyl diisocyanate, tetrametylene diisocyanate, hexamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanatemetylcaproate, and the like.

The alicyclic diisocyanates include, for example, 1,4-cyclohexane diisocyanate, 1,3-cyclohexane diisocyanate, 3-isocyanatemethyl-3,5,5-trimethylcyclohexyl isocyanate, 4,4'-methylenebis(cyclohexyl isocyanate), methyl-2,4-cyclohexane diisocyanate, methyl-2,6-cyclohexane diisocyanate, 1,4-bis(isocyanatemethyl)cyclohexane, 1,3-bis(isocyanatemethyl)cyclohexane, and the like.

The aromatic diisocyanates include, for example, m-phenylene diisocyanate, p-phenylene diisocyanate, diphenyl-4,4'-diisocyanate, naphthylene-1,5-diisocyanate, diphenylmethane-4,4'-diisocyanate, 2,4- or 2,6-trilene diisocyanate or mixtures thereof, 3,3'-dimethyldiphenylmethane-4,4'-diisocyanate, dimethyl-1,1'-biphenyl-4,4'-didsocyanate [or 4,4'-toluidine diisocyanate], dianilidine diisocyanate, diphenyl ether-4-4'-diisocyanate, and the like.

The aromatic aliphatic diisocyanates include, for example, 1,3- or 1,4-xylenediisocyanate or mixtures thereof, ω, ω'-diisocyanate-1,4-diethylbenzene, 1,3- or 1,4-bis(1-isocyanate-1-methylethyl)benzene or mixtures thereof, and the like.

The polyisocyanate monomers having 3 functional groups or more include, for example, organic triisocyanates such as triphenylmethane-4,4',4''-triisocyanate, 1,3,5-triisocyanatebenzene, 2,4,6-triisocyanatetoluene and the like, organic tetraisocyanates such as 4,4'-diphenyldimethylmethane-2,2'-5,5'-tetraisocyanate, and the like.

The polyisocyanates that may be used also include adducts formed by treating the above-described polyisocyanate with a low molecular polyer having a molecular weight of less than 200 such as ethylene glycol, propylene glycol, butylene glycol, hexylene glycol, neopentyl glycol, 1,6-hexanediol, 3-methyl-1,5-pentanediol, 3,3'-dimethylolpropane, cyclohexane dimethanol, diethylene glycol, triethylene glycol, dipropylene glycol, glycerol, trimethylolpropane, pentaerythritol and sorbitol, or with a polyol having a molecular weight of 200 to 20,000 of the type of polyester polyol, polyether ester polyol, polyester amide polyol, polycaprolactone polyol, polyvalerolactone polyol, acrylic polyol, polycarbonate polyol, polyhydroxyalkane, ricinus oil, or polyurethane polyol.

The partially acid-modified polyol and the polyisocyanate is preferably blended in such a way that the isocyanate group in the polyisocyanate is from 1.0 to 5.0 in terms of the ratio of its amount to its equivalent amount that is equivalent to the total of both the hydroxyl group and the carboxyl group in the partially acid-modified polyol(this ratio will be called "per-equivalent ratio" hereafter). A per-equivalent ratio of less than 1.0 renders the cure of the adhesive insufficient, thereby being unable to obtain high adhesion strength. A per-equivalent ratio exceeding 5.0 leads to disadvantages in curing time, sanitation properties and economy.

The adhesive of the present invention may be made to contain also an unmodified polyol or a multi-basic acid excepting the anhydrotrimellitate esters, or a partially acid-modified polyol modified by that multi-basic acid. Such a polyol can be contained in an adhesive of the present invention by adding the polyol to the adhesive or by using a partially-acid modified polyol composition obtained by reacting a polyol with both anhydrotrimellitic acid and the anhydrotrimellitate ester in such a ratio to cause an unreacted polyol to remain.

The additive of the present invention can additionally contain a silane coupling agent to improve the hot water resistance. The examples of the silane coupling agent include trialkoxysilanes having a vinyl group such as vinyltrimethoxysilane and vinyltriethoxysilane, trialkoxysilanes having an amino group such as 3-aminopropyltriethoxysilane and N-(2-aminoethyl)-3-aminopropyltrimethoxysilane, trialkoxysilanes having a glycidyl group such as 3-glycidoxypropyltrimethoxysilane, 2-(3,4-epoxycyclohexyl)ethyltrimethoxysilane, and 3-glycidoxypropyltriethoxysilane, and the like. The amount of addition of the silane coupling agent is preferably from 0.1 to 5% by mass based on the solid matter of the additive, and more preferably from 0.5 to 3% by mass.

Also, an additive of the present invention can further contain an oxygen acid of phosphorous or a derivative thereof to enhance acid resistance. Of oxygen acids of phosphorous or derivatives thereof, the oxygen acids of phosphorous appropriately have at least one free oxygen acid group. The examples include phosphorous-containing acids such as hypophosphorous acid, phosphorous acid, orthophosphoric acid and hypophosphoric acid, condensed phosphorous-containing acids such as metaphosphoric acid, pyrophosphoric acid, tripolyphosphoric acid, polyphosphoric acid and ultraphoshphoric acid. The derivatives of oxygen acids of phosphorus include species produced by partial esterification of the aforementioned oxygen acid of phosphorus with an alcohol in a condition where at least one oxygen acid group is remained free, and the like. The examples of the alcohol include aliphatic alcohols such as methanol, ethanol, ethylene glycol and glycerin, aromatic alcohols such as phenol, xylenol, hydroquinone, catechol and fluoroglycinol, and the like. The oxygen acids of phosphorus or derivatives thereof may be used in combination of two or more species. The amount of addition of oxygen acid of phosphorus or a derivative thereof is preferably from 0.01 to 10% by mass based on solid matter of the additive, more preferably from 0.05 to 5% by mass, and most preferably from 0.1 to 1% by mass.

An adhesive of the present invention can further comprises as required, for example, additives such as an antioxidant, an ultraviolet absorber, a hydrolysis inhibitor, a mildewproofing agent, a thickening agent, a plasticizer, a pigment and a filler. Furthermore, an additive of the present invention can comprise a well-known catalyst, an additive or the like to control curing reaction.

For an adhesive of the present invention, in the case where the viscosity thereof is from 100 to 10,000 mPa·s at from room temperature to 150° C., preferably at from room temperature to 100° C. and 100 to 5,000 mPa·s, it can be used as an adhesive of non-solvent type. If the viscosity of an adhesive is higher than the above range, the additive may be diluted with a solvent. As necessity arises, any organic solvents may be used as long as the organic solvent is unreactive to isocyanates, and, for example, esters such as ethyl acetate, ketones such as methylethylketone and aromatic hydrocarbons such as toluene and xylene can be given.

An adhesive of the present invention is applied to the surface of a film using a laminator of solvent-using type or solvent-free type. The resulting laminate can be used by curing at room temperature or under heating, after evaporating the solvent and then joining to another surface to be adhered for the solvent-using type, or directly bonding the surfaces together for the solvent-free type. Normally, an adhesive of a solvent-free type is favorably used at an application ratio that a dried solid matter amount per area is from 1.0 to 2.0 g/m$^2$; an adhesive of a solvent type at a ratio of a dried solid matter amount being from 2.0 to 5.0 g/m$^2$.

Now, a laminate for packaging of the present invention will be described. A laminate for packaging of the present comprises a first sheet-shaped substrate and a second sheet-shaped substrate which are laminated via an adhesive layer formed of the adhesive of the present invention.

The sheet-shaped substrate possibly comprises a plastic film, paper, a metal foil or the like, which is usually used for a laminate for packaging. The first sheet-shaped substrate and the second sheet-shaped substrate may be of the same kind or different kinds. For the plastic film, a film of a thermoplastic resin or a thermoset resin can be used, and a thermoplastic resin film is preferable. The examples of thermoplastic resin include polyolefins, polyesters, polyamides, polystyrene, vinyl chloride resin, vinyl acetate resin, ABS resin, acrylic resin, acetal resins, polycarbonate resin, cellulose plastics, and the like.

The thickness of a laminate for packaging is usually 10 μm or more. Processes for fabricating a laminate for packaging can include a usual fabricating method that involves, for example, applying an adhesive to one side of a sheet-shaped substrate by means of a dry laminator, evaporating the solvent, bonding the substrate to the other sheet-shaped substrate, and subsequently curing the resulting laminate at room temperature or under heating. The amount of an adhesive applied to the surface of a sheet-shaped substrate is about 1 to about 10 g/m$^2$.

EXAMPLES

Next, the present invention will be set forth in more detail in terms of Examples and Comparative Examples.

Production Examples 1 to 5

Into a vessel, 13.28 kg of isohpthalic acid, 2.48 kg of ethylene glycol, 4.16 kg of neopentyl glycol and 4.72 kg of 1,6-hexanediol were charged and an esterification reaction was carried out at from 200 to 230° C. for 6 hours. After a prescribed amount of water was distillated, 2.92kg of adipic acid was added and then an esterification reaction was further carried out for 6 hours. After a prescribed amount of water was distillated, the pressure was gradually reduced to $1.21 \times 10^2$ to $1 \times 10^3$ Pa and an esterification reaction was carried out at that pressure at a temperature in a range of 230 to 250° C. for 5 hours to obtain a polyester polyol having a number average molecular weight of 5,000, a hydroxyl value of 23 mg KOH/g, and an acid value of 0.5 mg KOH/g. Further, 0.75 kg of isophorone diisocyanate was gradually dropped into the above product (NCO/OH molar ratio being 0.7 based on the whole amount of polyester polyol) and then a reaction was conducted at 150° C. for about 2 hours to yield a polyester polyurethane polyol having a number average molecular weight of 13,000, a hydroxyl value of 7 mg KOH/g, and an acid value of 0.5 mg KOH/g.

To 484 g of this polyester polyurethane polyol added were anhydrotrimellitic acid and ethylene glycol anhydrotrimellitate at amounts shown in Table 1, and then a reaction was carried out at 180° C. for about 2 hours to obtain a partially acid-modified polyol in each of Production Examples 1 to 5. This resulting material was adjusted to have 50% by mass of non-volatile matter using ethyl acetate, to obtain each of partially acid-modified polyol solutions A to E. These partially acid-modified polyol solutions were determined for viscosities thereof and were visually observed for the appearances thereof immediately after preparation and after 3-month storage at 25° C.

laminate strength test, hot water resistance test, and acid resistance test, as described below. The result is shown in Table 3.

Polyisocyanate: CAT-RT86 (tradename of a mixture of adduct of xylylene diisocyanate with trimethyrolpropane and adduct of isophorone diisocyanate with trimethyrolpropane, product of Toyo Morton K.K. in Japan)

Silane coupling agent: γ-glycidoxypropyltrimethoxysilane (product of Shin-Etsu Chemical Co., Ltd. in Japan)

(Preparation of 4-layer Composite Laminates)

Four-layer composite laminates of a polyethylene terephthalate (PET) film (thickness: 12 μm)/print/nylon (NY) film (thickness 15 μm)/aluminum (AL) foil (thickness: 9 μm)/cast polypropylene (CPP) film (thickness: 70 μm, surface corona discharge treatment) were fabricated in accordance with the method below. Specifically, the method comprises: first applying the adhesive solution to a polyethylene terephthalate film at room temperature using a laminator; evaporating the solvent; bonding the coated surface to a nylon film, similarly applying the adhesive solution to the nylon film surface of the laminate; evaporating the solvent; bonding the coated surface to the surface of an aluminum foil; similarly applying the adhesive solution to the aluminum foil surface of the laminate; evaporating the solvent; bonding the coated surface to a un-stretched polypropylene film; and then keeping the resulting material at 40° C. for 4 days to fabricate a 4-layer composite laminate. In Table 3, the symbol G of a laminate appearance indicates good quality and the symbol NG shows that glue-lacking spots were present on the entire surface.

(Laminate Strength Test)

Test strips having a size of 15 mm×300 mm were cut out of the 4-layer composite laminate fabricated as described above. Using a tensile testing machine, the strips were measured for laminate strengths (N/15 mm) between the PET film and the NY film, between the NY film and the AL foil, and between the AL foil and the CPP film under the

TABLE 1

|  | Production Examples | | | | |
| --- | --- | --- | --- | --- | --- |
|  | 1 | 2 | 3 | 4 | 5 |
| Partially acid-modified polyol solution | A | B | C | D | E |
| Polyester polyurethane polyol(g) | 484 | 484 | 484 | 484 | 484 |
| Anhydrotrimellitic acid(g) | 9.2 | 0.6 | 1.2 | 2.9 | 4.6 |
| Ethylene glycol anhydrotrimellitate(g) | 0.5 | 11.3 | 2.5 | 6.2 | 9.8 |
| Ethyl acetate(g) | 493.7 | 495.9 | 487.7 | 493.1 | 498.4 |
| Number average molecular weight | 10,000 | 15,000 | 13,000 | 12,000 | 12,000 |
| Hydroxyl value(mg-KOH/g) | 4 | 3 | 6 | 3 | 2 |
| Acid value(mg-KOH/g) | 13 | 9 | 4 | 2 | 15 |
| Acid addition degree (mass %) | 80 | 50 | 20 | 50 | 80 |
| Solution viscosity(mPa · s at 25° C.) | 550 | 700 | 640 | 630 | 620 |
| Solution appearances  Immediately after preparation | Good | Good | Good | Good | Good |
| Solution appearances  After 3 months at 25° C. | No good | Good | Good | Good | Good |

Examples 1 to 4, and Comparative Examples 1 and 2

Partially acid-modified polyol solutions A to E, a polyisocyanate indicated below, a silane coupling agent and ethyl acetate were blended at the ratios (mass ratio) shown in Table 2 to obtain adhesive solutions having 25% by mass of non-volatile matter. These adhesive solutions were used respectively to fabricate laminates by the method below and then each of the resulting laminates were subjected to conditions of a temperature of 20° C. and a relative humidity of 65% by T type release at a release rate of 30 cm/minute. The values shown in Table 3 are average values for 5 test pieces, and "RI" means that releasing between the films of the laminate was impossible.

(Hot Water Resistance Test)

A pouch with a size of 21 cm×30 cm was fabricated using each of the 4-layer composite laminates and was vacuum charged with 1 kg of water as content. This pouch was hot water sterilized at 10 rpm at 135° C. for 30 minutes at a pressure of 3 MPa, and it was then observed for release states between the PET film and the NY film, between the NY film and the AL foil, and between the AL foil and the CPP film. In Table 3, the symbol G of release appearance indicates good conditions, the symbol PR indicates the presence of partial release, and the symbol ER indicates the presence of release on the entire surface.

(Acid Resistance Test)

A pouch with a size of 9 cm×13 cm was fabricated using each of the 4-layer composite laminates and was charged with vinegar having a concentration of 4.2% by mass or more as contents. This pouch was hot water sterilized at 3 rpm at 135° C. for 30 minutes at a pressure of 3 MPa, and then was observed for release states between the AL foil and the CPP film after storage for 2 weeks at 60° C. and after storage for 4 weeks at 60° C. In Table 3, the symbol G of release appearance indicates good conditions, the symbol PR indicates the presence of partial release.

TABLE 2

|  | Example | | | | Comparative Example | |
|---|---|---|---|---|---|---|
|  | 1 | 2 | 3 | 4 | 1 | 2 |
| Partially acid-modified polyol solution A |  |  |  |  | 100 |  |
| Partially acid-modified polyol solution B |  |  |  |  |  | 100 |
| Partially acid-modified polyol solution C | 100 |  |  |  |  |  |
| Partially acid-modified polyol solution D |  | 100 | 100 |  |  |  |
| Partially acid-modified polyol solution E |  |  |  | 100 |  |  |
| Silane coupling agent | 0.5 |  | 0.5 | 0.5 | 0.5 | 0.5 |
| Organic polyisocyanate | 10 | 10 | 10 | 10 | 10 | 10 |
| Ethyl acetate | 121.5 | 120 | 121.5 | 121.5 | 121.5 | 121.5 |

TABLE 3

|  |  |  | Example | | | | Comparative Example | |
|---|---|---|---|---|---|---|---|---|
|  |  |  | 1 | 2 | 3 | 4 | 1 | 2 |
| Laminate appearance | PET/ink/NY/AL | After laminating | G | G | G | G | G | NG |
| Laminate strength | PET/NY | Before retorting | RI | RI | RI | RI | RI | RI |
|  |  | After retorting | RI | RI | RI | RI | RI | RI |
|  | NY/AL | Before retorting | 5.2 | 5.3 | 5.0 | 5.2 | 4.2 | 5.2 |
|  |  | After retorting | 4.3 | 3.2 | 4.5 | 4.8 | 3.7 | 4.5 |
|  | AL/CPP | Before retorting | 9.8 | 8.3 | 10.0 | 10.3 | 9.5 | 10.0 |
|  |  | After retorting | 9.2 | 9.0 | 9.8 | 9.5 | 8.6 | 9.5 |
| Hot water resistance (release appearance) | PET/NY | After retorting | G | G | G | G | G | G |
|  | NY/AL | After retorting | G | PR | G | G | ER | G |
|  | AL/CPP | After retorting | G | G | G | G | G | G |
| Acid resistance (release appearance) | AL/CPP | After 2 weeks at 60° C. | G | G | G | G | G | G |
|  |  | After 4 weeks at 60° C. | PR | G | G | G | G | G |

According to the results of Tables 1 and 3, it is understood that an increase in acid addition degree using anhydrotrimellitic acid to enhance acid resistance is likely to decrease the molecular weight, deteriorate the solution appearance with the lapse of time, and spoil appearance between the nylon film and the aluminum foil after retorting, and that an excessive increase in use ratio of anhydrotrimellitate ester similarly has a tendency to cause an increase in the molecular weight and viscosity, thereby leading to the disadvantage of deteriorating appearance of the laminate. The use of a mixture in a specified ratio of anhydrotrimellitic acid and anhydrotrimellitate ester renders compatible the laminate aptitudes such as the stability of an adhesive resin solution, laminate appearance and adhesion performance.

It must be understood that the invention is in noway limited to the above embodiments and that many changes may be brought about therein without departing from the scope of the invention as defined by the appended claims.

What is claimed is:

1. An adhesive comprising:
   a polyisocyanate; and
   a partially acid-modified polyol which comprises a product of reacting a polyol with anhydrotrimellitic acid and an anhydrotrimellitate ester at a ratio such that the anhydrotrimellitic acid is 10 to 70% by mass and the anhydrotrimellitate ester is 90 to 30% by mass, as the sum of the anhydrotrimellitic acid and the anhydrotrimellitate ester is 100% by mass.

2. The adhesive of claim 1, wherein the anhydrotrimellitate ester comprises ethylene glycol bisanhydrotrimellitate represented by the formula (1).

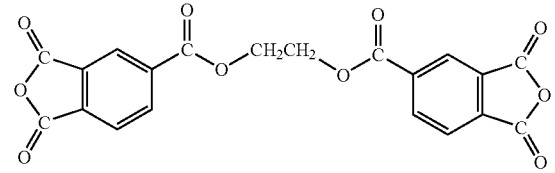

(1)

3. The adhesive of claim 1, wherein the polyol has a number average molecular weight of 500 to 100,000.

4. The adhesive of claim 1, wherein the polyol comprises a polyester polyurethane polyol.

5. The adhesive of claim 1, further comprising a silane coupling agent.

6. The adhesive of claim 1, wherein 20 to 90 % of hydroxy groups of the polyol are acid-modified.

7. A laminate for packaging, comprising:
   a first sheet-shaped substrate and a second sheet-shaped substrate; and
   the adhesive of claim 1 through which the first sheet-shaped substrate and the second sheet-shaped substrate are laminated.

8. The laminate of claim 6, wherein the first sheet-shaped substrate comprises a plastic film, and the second sheet-shaped substrate comprises a metallic foil.

9. An adhesive comprising:
   a polyisocyanate; and
   a partially acid-modified polyol which comprises a product of reacting a polyol with anhydrotrimellitic acid and an anhydrotrimellitate ester at a ratio such that the anhydrotrimellitic acid is 10 to 70% by mass and the anhydrotrimellitate ester is 90 to 30% by mass, as the sum of the anhydrotrimellitic acid and the anhydrotrimellitate ester is 100% by mass, wherein the polyol comprises a polyesther polyurethane polyol having a number average molecular weight of 1,000 to 30,000 and being product of reacting a polyester polyol having a number average molecular weight of 200 to 20,000 with a polyisocyanate at the molecular ratio of NCO/OH being less than 1.

10. The adhesive of claim 9, wherein 20 to 90% of hydroxy groups of the polyol are acid-modified.

* * * * *